United States Patent [19]

[11] 3,730,980

[45] May 1, 1973

Kirk, Jr.

[54] ELECTRONIC COMMUNICATION APPARATUS FOR SELECTIVELY DISTRIBUTING SUPPLEMENTARY PRIVATE PROGRAMMING

[75] Inventor: Donald Kirk, Jr., St. Petersburg, Fla.

[73] Assignee: Television Communications Corporation, New York, N.Y.

[22] Filed: May 24, 1971

[21] Appl. No.: 146,086

[52] U.S. Cl. ........................178/5.1, 325/32, 325/33

[51] Int. Cl. ..............................................H04n 1/44

[58] Field of Search .........................178/5.1; 325/32; 179/1.5 R, 1.5 FS

[56] References Cited

UNITED STATES PATENTS

| | | | |
|---|---|---|---|
| 3,187,091 | 6/1965 | Quan et al. | 178/5.1 |
| 2,983,781 | 5/1961 | Shanahan et al. | 178/5.1 |

*Primary Examiner*—Benjamin A. Borchelt
*Assistant Examiner*—S. C. Buczinski
*Attorney*—Sandoe, Hopgood and Calimafde

[57] ABSTRACT

Private programming information, e.g., television programs provided for a community antenna television signal distribution system (CATV) to supplement those programs received from local commercial television stations, are propagated over a common cable medium, and are selectively recoverable only by participating subscribers.

Two private programs are formed with inverted modulation spectra in the mid-band channel frequency spacing. One or both programs are recovered at participating subscriber stations by heterodyne converters which re-invert the encripted signals, shifting one or both signal spectra to otherwise unoccupied commercial channels for recovery by a conventional television receiver.

4 Claims, 3 Drawing Figures

INVENTOR.
DONALD KIRK, JR.
BY
Sandoe, Hopgood & Calimafde
ATTORNEYS

INVENTOR.
DONALD KIRK, JR.

BY

Sandoe, Hopgood & Calimafde
ATTORNEYS

ELECTRONIC COMMUNICATION APPARATUS FOR SELECTIVELY DISTRIBUTING SUPPLEMENTARY PRIVATE PROGRAMMING

DISCLOSURE OF INVENTION

This invention relates to electronic communications and, more specifically, to a transmission system for effecting restricted program distribution to system subscribers.

In selected present day private communications systems, it has been found desirable to provide some electronic intelligence which may be received only by designated system subscribers who pay for this service. For example, the proprietor of a community antenna television (CATV) system inherently has excess signal propagating capacity beyond that required for programs recovered from local television stations, as by reason of unused channels (frequency bands) in any locality, and the mid-band frequency spacing between channels 6 and 7.

The CATV system operator may thus impress additional, private programming information on his distribution cable for viewing by system subscribers who pay an additional consideration to support this additional service. As a practical matter, it is required that nonparticipating system subscribers not receive the private programming information as a matter of course.

It is therefore an object of the present invention to provide improved restricted distribution private communication apparatus.

More specifically, an object of the present invention is the provision of complementary signal encoding-signal recovery apparatus wherein plural intelligence signals may be reliably generated, propagated over common transmission apparatus, and received only at participating subscriber stations.

It is a specific object of the present invention to provide apparatus for restricting the distribution of private television programming.

The above and other objects of the present invention are realized in a specific, illustrative CATV system wherein a specific one or both of two supplementary private video programs are propagated and received by differing service classes of system subscribers. The two supplementary programs are impressed on the cable in the mid-band spacing between the channel 6 and 7 spectra and are inverted vis-a-vis conventional television signals; i.e., have their modulated sound carrier at a frequency lower than the video, or main carrier and have a vestigial upper rather than lower video sideband.

Each participating subscriber has a frequency-shifting heterodyne receiver-converter for recovering one or both of the private programs. Depending upon his class of service, the frequency of the converter local oscillator at a subscriber station inverts the modulation spectrum of the supplementary programs and shifts the frequency spectrum of one or both programs into locally unused channels recoverable by a conventional television receiver. Cable system subscriber not having the converter apparatus can receive only locally broadcast commercial television signals.

The above and other features and advantages of the present invention are realized in a specific, illustrative embodiment thereof, described in detail hereinbelow in conjunction with the accompanying drawing, in which.

Figure 1:
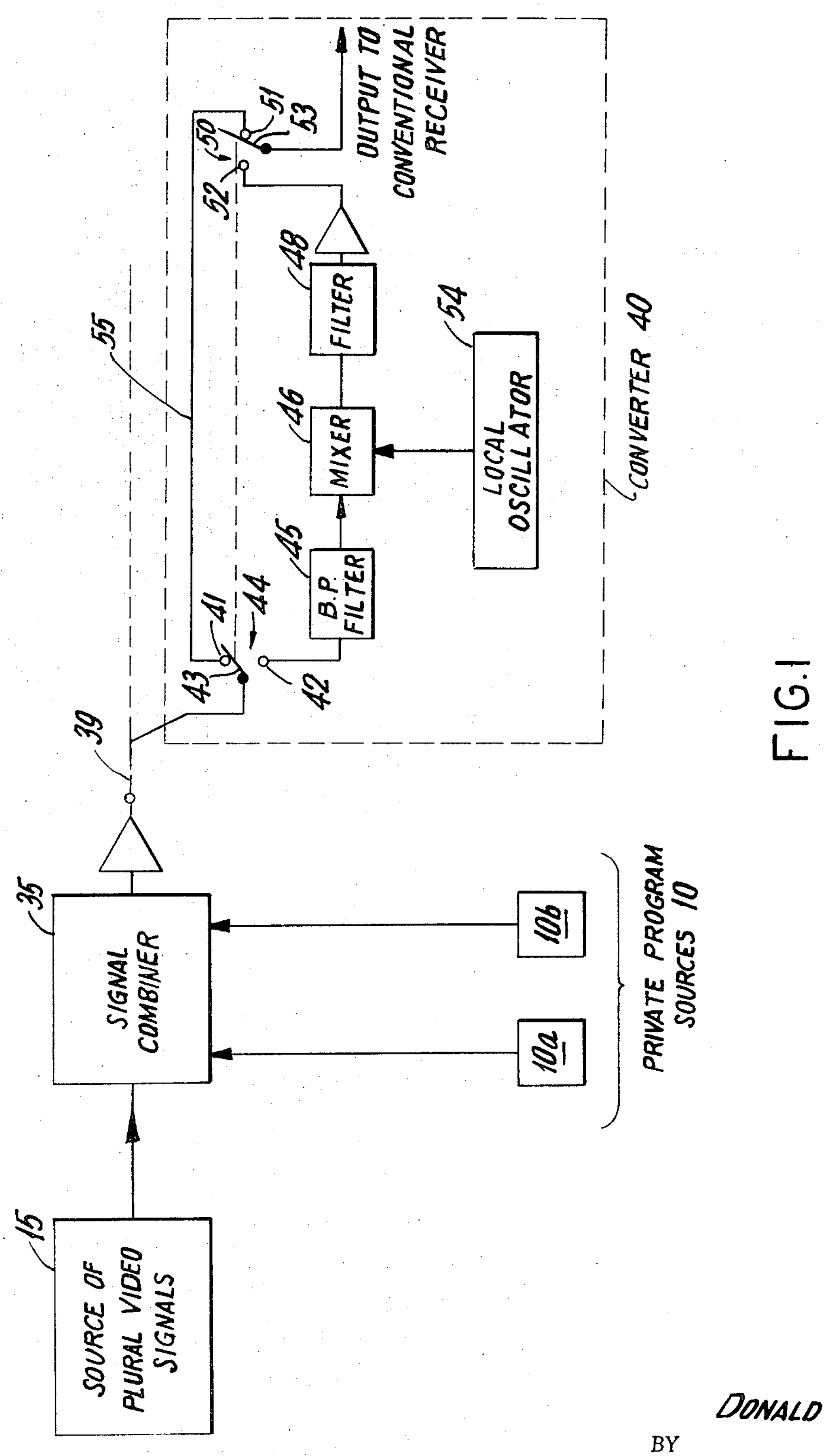
FIG. 1 is a block diagram depicting a restricted program signal generating, distribution and recovery system embodying the principles of the present invention.

Referring now to FIG. 1, there is shown encoded signal generating, distributing and signal recovery apparatus employed, for example, for the restricted distribution of television programming in a community antenna television system. The system supplies plural television programs, separated in frequency while coincidentally present on a distribution cable-amplifier network 39, for distribution to individual cable subscribers.

The programs impressed on the cable are of two basic types. First, a source of plural video signals 15 comprises conventional apparatus for recovering all television programs broadcast by local commercial television stations. These signals are typically received by a sophisticated, well situated antenna complex, amplified, and impressed on the distribution cable network 39 without change of form. The commercial programming may be viewed by a conventional television receiver at all subscriber stations connected to the cable in a straightforward manner.

As discussed above, the television signal distribution system 39 for CATV installations includes communication capacity beyond that consumed by available local commercial stations. Such spare bandwidth capacity exists, for example, in vacant frequency channels not occupied by nearby commercial television stations, and in the frequency spacing between commercial channels 6 and 7 (assuming the cable does not also distribute commercial frequency modulation broadcasting). Thus, the proprietor of a private system such as a CATV network may generate one or more supplementary television programs for distribution on its private network relying upon an already existing, otherwise unused signal propagation capability. This private, noncommercial programming may comprise special or sporting events; current run theater or motion picture productions; educational programming, special services such as security listings; or any other desired program content.

As an economic matter, the special programming generated by the proprietor of the cable distribution system will typically require extra revenues from cable subscribers to be economically viable. Accordingly, some mechanism is required to prevent those subscribers connected to the cable network who do not wish to pay an extra premium for special programming from receiving such programming content while permitting subscribers desiring these signals to obtain them. Moreover, when more than one private program is employed, it may be desirable to furnish any particular restricted service subscriber with some particular subset of the array of private programs, there thus being different classes of supplementary service subscription. To this end and in accordance with one aspect of the present invention, restricted television programs are impressed on the cable 39 of FIG. 1 in a non-standard, and therefore encripted manner. Correspondingly, converter apparatus 40 is provided at each participating subscriber station to reverse the encription process such that the proper private program (s) may be viewed by a participating subscriber at that station.

To effect the restricted supplementary program distribution, in addition to the commercial television programs supplied by the source 15 of FIG. 1, two sources $10_a$ and $10_b$ furnish two encoded, private programs A and B. In particular, and referring now to FIG. 2A there is shown the modulation spectrum for a conventional television program. The vertical ordinate in FIG. 2A is a measure of relative signal strength and the lateral abscissa is a measure of relative frequency, i.e., frequency relative to the lower cut off of the modulation channel which is given by 0 in FIG. 2A.

The modulation spectrum for a conventional television program comprises a picture or video carrier 1.25 megacycles above the lower channel frequency cut off which is amplitude modulated with essentially up to 4.5 megacycles of video information. To conserve bandwidth, the video signal is transmitted on a vestigial side band basis with all lower side band information beyond 1.25 megacycles being suppressed.

The picture sound carrier is located 5.75 megacycles from the lower channel bound and 4.5 megacycles above the picture carrier. The sound carrier is frequency modulated with the program sound information with a 75 kilocycle maximum deviation.

Figure 2A:
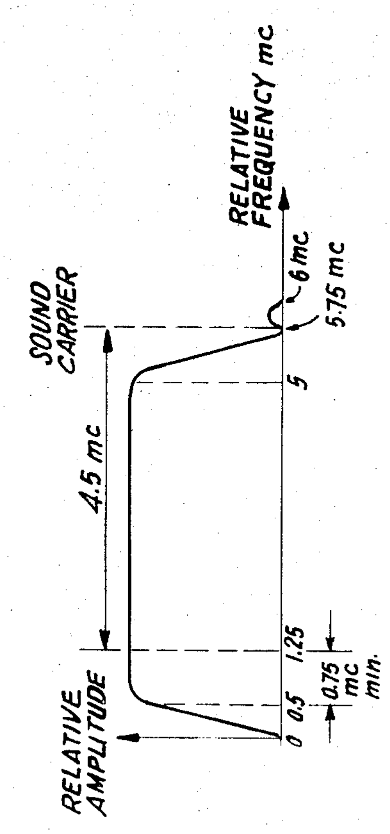
FIG. 2A illustrates the modulation spectrum for a conventional commercial television signal.

The conventional television program of FIG. 2A, i.e., the signal modulation spectrum there shown, is broadcast in one of the FCC prescribed channels each of which is six megacycles wide corresponding to the six megacycle program content shown in FIG. 2A. The frequency spectra for commercial channels are as follows:

| Channel No. | Frequency Allocation in Megacycles |
|---|---|
| 2 | 54–60 |
| 3 | 60–66 |
| 4 | 66–72 |
| 5 | 76–82 |
| 6 | 82–88 |
| 7 | 174–180 |
| 8 | 180–186 |
| 9 | 186–192 |
| 10 | 192–198 |
| 11 | 198–204 |
| 12 | 204–210 |
| 13 | 210–216 |

Figure 2B:
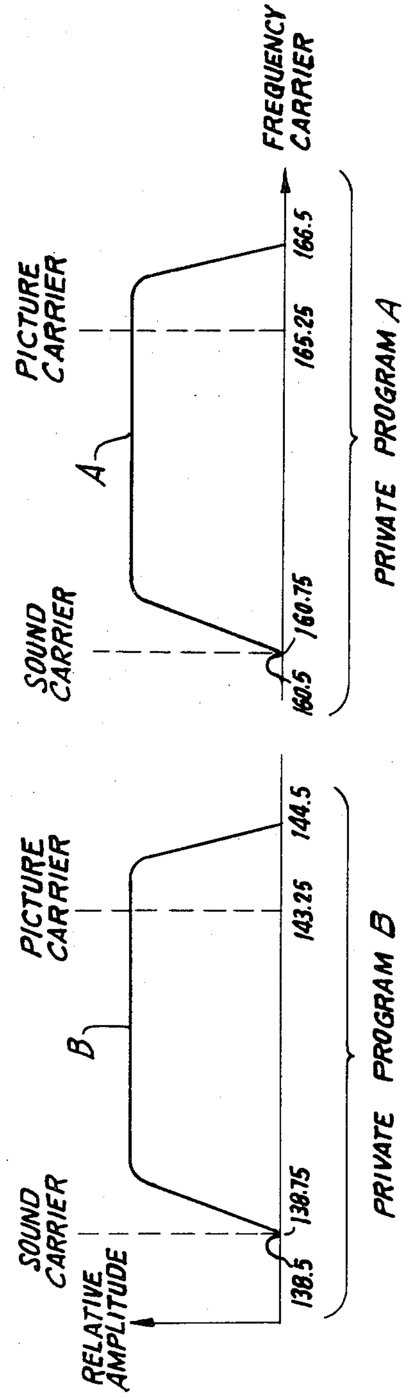
FIG. 2B depicts the modulation spectrum for two private television programs selectively distributed by the system of FIG. 1.

Modulation spectra for the assumed two private programs to be distributed to subscribers of the cable network 39 of FIG. 1; that is, the A and B programs respectively supplied by the private program sources $10_a$ and $10_b$, in accordance with the principles of the present invention, are shown in FIG. 2B. In correspondence with conventional television programs, each of the A and B program modulation spectrum has a bandwidth of six megacycles. However, the A and B programs of FIG. 2B are each the mirror image of the conventional spectrum of FIG. 2A, having the picture carrier 1.25 megacycles below its upper frequency cut off; its frequency modulated sound carrier 5.75 megacycles below the upper frequency cut off, and a vestigial upper video side band. The absolute frequencies depicted in FIG. 2B are all within the midband gap between channels 6 and 7 (88–174 mc) to not interfere with any received local commercial stations. The absolute frequency values shown in FIG. 2 may be varied from those indicated within the limits of the mid-band into channel range provided, however, a prefixed relationship of the relative frequencies of the programs is maintained, as more fully considered below.

Specific embodiments for sources $10_a$ and $10_b$ which provide the A and B modulated television programs will be readily apparent to those skilled in the art. The inverted programs may be formed by directly employing well known modulation, filter and linear summing apparatus, or may comprise conventionally available television signal producing apparatus and heterodyning means for reversing the normal television spectrum by mixing the conventional signal with a local oscillator of a frequency above the upper frequency cut off of the conventional modulation signal.

The two restricted distribution encripted programs of FIG. 2B supplied by the sources $10_a$ and $10_b$ are linearly combined with the conventional television programs supplied by the source 15 in a signal combiner 35, and impressed on the distribution cable network 39 via an amplifier 38. The signal combiner 35 may be of any conventional construction, e.g., of basic hybrid coil form.

Subscribers to the cable network, but not participating in the private signal distribution, receive the conventional programs recovered by the video signal source 15 in routine manner. These receivers do not have selector apparatus for tuning to the mid-band frequency range, and thus are completely unaware of, not affected by, and are unable to receiver either of the supplementary programs. Moreover, any surreptitious attempt by a non-participating subscriber to view the private programming signals by a direct frequency shifting process will be completely futile, the signals being inverted in relative frequency from that receivable by commercial receiver apparatus.

Participating subscribers have as an input to their conventional television receivers the output of a receiver-converter 40, one illustrative such converter being shown in FIG. 1. When the viewer wishes to receive a conventional program, two ganged selector switches 44–50 have their transfer members 43 and 53 connected to switch terminals 41 and 51 such that the cable signals are directly connected to the conventional receiver which thus operates in normal fashion. With the switches 44 and 52 in this position, all converter electronics are directly by-passed by the direct shunt 55. The switch apparatus 44–50 is employed only for power conservation purposes, i.e., such that no power is supplied to the converter electronics when a commercial channel is selected for viewing.

When the subscriber at the converter 40 wishes to receive a private program A or B, the switches 44 and 50 are disposed such that the transfer members 44 and 53 contact the switch terminals 42 and 52 respectively. Depending upon the subscription basis of the subscriber, the converter 40 will then permit viewing of a particular one, or both of the private programs.

Consider first the situation where the subscriber at the particular station under consideration has opted to subscribe only to the program A channel. For the particular private program frequency values given in FIG.

2B, the local oscillator 54 of the heterodyne converter provides an output sinusoid of frequency 242.5 megacycles. The two private programs, supplied to a mixer 46 via a wide band selecting band pass filter 45 are then heterodyned (non-linearly beat) to produce a first order difference frequency spectrum of 76–82 mc (program A) and 98–104 mc (program B). Thus, the desired A program is shifted in frequency to the channel 5 band (the first order heterodyning difference signal being selected by a low pass filter 48 in conventional heterodyning fashion). Correspondingly, the channel B program is shifted to a frequency spectrum in the mid-band range and is unavailable for reception by a conventional receiver.

Moreover, since the local oscillator is above the transmitted frequencies of FIG. 2B, the inverted modulating spectra of FIG. 2B are reinverted to their proper orientation (that of FIG. 2A) by the heterodyning process at the converter 40. That is, the former upper frequency point 166.5 mc becomes the lower channel 5 bound 76 mc, while the former lower frequency channel A point of 160.5 mc is reversed to become the upper channel 5 bound at 82 mc. Thus a subscriber can receive the desired program A by simply tuning his conventional receiver to channel 5. He is unable to receive the B program which falls in the mid-band spectrum. It is observed that, at this point in time, substantially all television receivers are of a discreet tuning type and can receive, at least as far as the VHF band is concerned, only the discreet frequency spectrum assigned to commercial channels 2–6 and 7–13.

It has been tacitly assumed in the above discussion that the subscriber permitted to receive the channel A is located in an area where there was no local commercial channel 5. If this is not the case, the A program may simply be reversed and moved to the then vacant channel 6 (either channels 3 and 6 or channels 2 and 5 are not assigned in any area) spectrum by simply employing a local oscillator of 248.5 mc rather than 242.5 mc. As a generalized mathematical proposition, if the higher frequency transmitted restricted signal spectrum and the desired vacant commercial channel have upper and lower frequency bounds of $f1$ and $f2$, and $f3$ and $f4$, the local oscillator 54 is given a characteristic frequency $f5$ where $f5-f2=f3$ or, otherwise stated, $f5-f1=f4$.

In a similar manner, the converter 40 can establish any other class of service for the subscriber station. Thus, for example, if the converter 40 is to permit the subscriber to receive only the program B and not the program A, a local oscillator frequency of 204.5 mc will shift the B (lower frequency) channel to an assumed blank channel 3 spacing while inverting the modulation spectrum such that the B program can be received by simply tuning the conventional following receiver to channel 3. Correspondingly, the A program will then be shifted to a frequency well below that of channel 2 and thus be unrecoverable at the subscriber station. Similarly, if channel 2 were vacant rather than channel 3, a local oscillator frequency of 198.5 mc will be seen to shift the B program to channel 2 while again moving the A program to a frequency spectrum well below that recoverable by a conventional receiver.

Finally, if the converter is to permit the subscriber to receive either the A or B program, a local oscillator of 220.5 mc will shift the B program to channel 5 and the A program to channel 2 such that each may be selectively received. If channel 3 and channel 6 are vacant rather than channel 2 and channel 5, a local oscillator frequency of 226.5 mc will suffice to make both the A and B programs selectively available. For either channel selection, the A–B program frequency difference is made to correspond with the 22 mc spacing between channels 2–5 or 3–6.

Thus, the above arrangement has been shown to provide restricted supplementary television program signals which accompany commercial programs over a distribution network. Depending upon converter equipment provided a subscriber (or not provided at all), the particular programs to be received by a subscriber may be fully controlled.

The above arrangement is merely descriptive of the principles of the present invention. Numerous modifications and adaptations thereof will be readily apparent to those skilled in the art without departing from the spirit and scope of the present invention. For example, in the above-described arrangement, the particular frequency values may vary, while preserving the relationship between the local oscillator frequency, the frequencies of the private program frequency spectra and the vacant commercial channels. Also, any vacant channels may be employed to effect the requisite restricted signal distribution.

What is claimed is:

1. In combination in a television communication system for propagating private supplementary television signals; means for supplying at least one private program having an inverted modulation spectrum with a sound carrier lower in frequency than the picture carrier and a vestigial upper video side band, means for distributing said private television program, and converter means coupled to said distributing means for recovering said private programs, said converter means including heterodyning means for reversing the modulation spectrum of said private program distributed by said distribution means, said heterodyning means including mixer means and local oscillator means for providing an output signal higher in frequency than the highest frequency of said distributed private television programs for inverting the modulation spectrum of said private programs and for shifting the inverted spectrum in frequency, wherein said private program supplying means including means for supplying two private programs, each having an inverted modulation spectrum and a vestigial upper video side band, said programs having all frequencies components thereof in the range 88–174 mc, said two spectra having corresponding parts thereof separated by the interchannel frequency difference between two commercial television channels.

2. A combination as in claim 1 wherein said local oscillator includes means for generating an output frequency for shifting only one of said programs to a conventional television frequency channel.

3. A combination as in claim 1, wherein said local oscillator includes means for generating an output frequency for shifting the frequency spectra of both of said signals to that of commercial television frequency channels.

4. A combination as in claim 1, said two spectra having corresponding parts thereof separated by 22 megacycles.

* * * * *